UNITED STATES PATENT OFFICE.

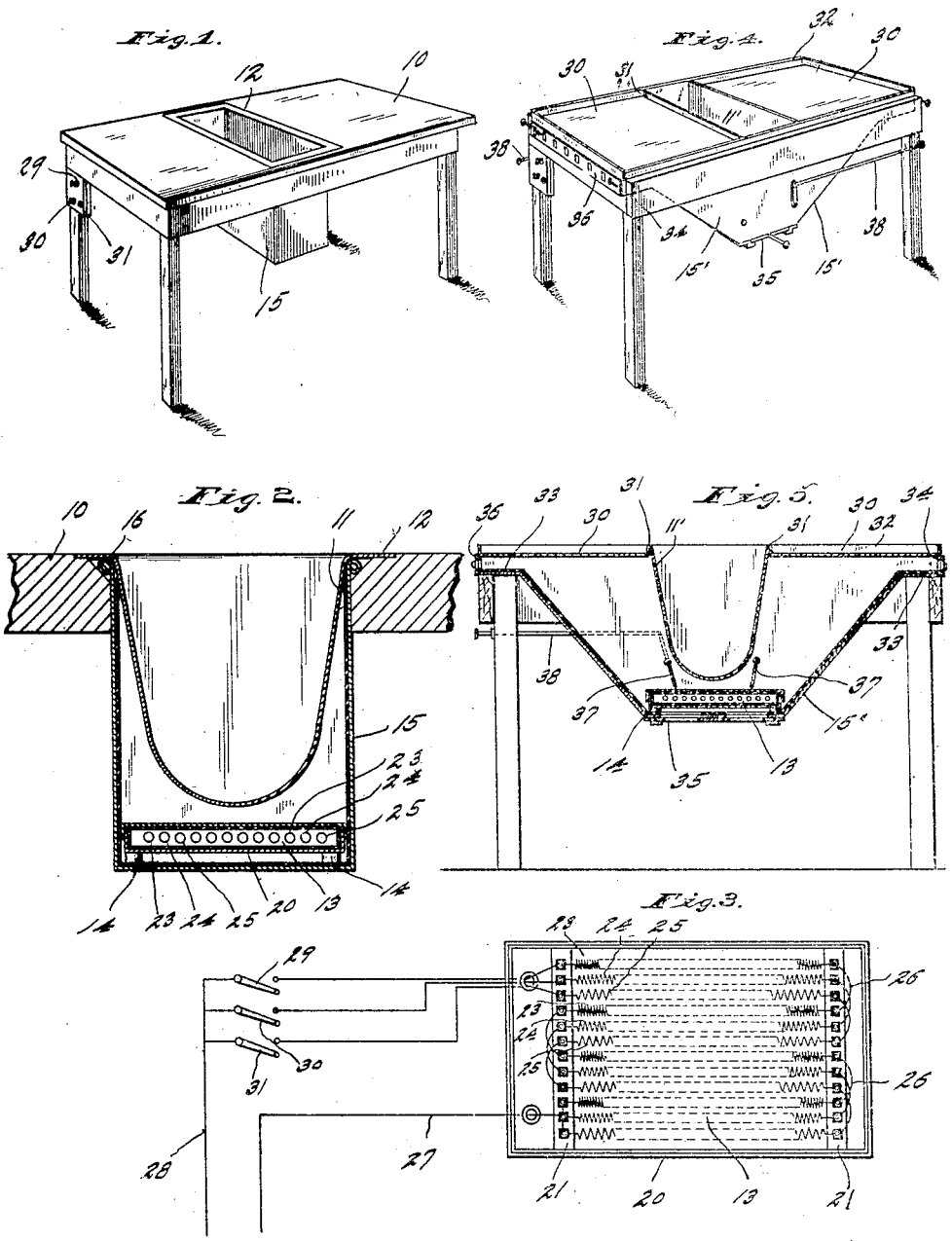

HENRY W. SCHWIMMER, OF INDIANAPOLIS, INDIANA, ASSIGNOR TO H. W. SCHWIMMER COMPANY, OF INDIANAPOLIS, INDIANA, A CORPORATION OF INDIANA.

ELECTRICALLY-HEATED CHOCOLATE-TABLE.

1,205,569.

Specification of Letters Patent.

Patented Nov. 21, 1916.

Application filed November 7, 1914. Serial No. 870,744.

*To all whom it may concern:*

Be it known that I, HENRY W. SCHWIMMER, a citizen of the United States, residing at Indianapolis, in the county of Marion and State of Indiana, have invented a new and useful Electrically-Heated Chocolate-Table, of which the following is a specification.

In the manufacture of chocolate-coated candy the centers, such as creams or nuts, are dipped into melted chocolate, and this chocolate must be maintained at a uniform temperature for the production of the better candies.

It is the object of my invention to provide an electric heating device for maintaining the chocolate at this uniform temperature, the heater acting either on the central pot or reservoir of the table or both on such pot or reservoir and on those portions of the table in which the dipping is done; and to obtain the heating in a uniform and perfectly controlled manner.

The accompanying drawings illustrate my invention.

Figure 1 is a perspective view of a chocolate table embodying one form of my invention; Fig. 2 is a vertical section through the chocolate pot or reservoir and its heating means and the adjacent part of the table; Fig. 3 is a diagram of the electrical connections; and Figs. 4 and 5 are views somewhat similar to Figs. 1 and 2 respectively, but showing a modified construction wherein both the chocolate reservoir and the dipping portions of the table are heated.

Referring first to the arrangements shown in Figs. 1 and 2, the top of the table 10 has a central opening to receive within it the chocolate-holding pot 11 and its heating mechanism. The chocolate pot or reservoir 11 conveniently has a round bottom and sloping sides and the top is provided with a flange 12 for resting on the table 10 whereby the chocolate pot is supported. The heating element 13 is mounted on legs 14 at the bottom of and within a receptacle 15 into which the chocolate pot 11 depends, the receptacle 15 being provided at its upper edge with a rolled flange 16 which rests in a groove at the edge of the opening in the table top 10, the chocolate pot 11 being spaced from the heater 13 and from the sides of the receptacle 15, save where it meets the latter at the top, as is clear from Fig. 2.

The heating element 13 consisting of a metal casing 20 lined with insulation and having within it a plurality of cross bars 21 on which are supported the ends of a plurality of helical heating coils 23, 24, and 25. As shown, there are twelve coils altogether, four of each kind, the coils 23, 24, and 25 differing among themselves in resistance value so as to have different heating effects, and each set of coils—that is, the coils 23, or the coils 24, or the coils 25—being substantially equally distributed throughout the casing 20. In other words, between each two like coils, such as two adjacent coils 23, there is one of each of the other kinds of coils, say a coil 24 and a coil 25. The ends of the corresponding coils are cross-connected by connectors 26 so that all the coils of one kind are in series. One set of corresponding ends of these three series of coils are connected in common to a wire 27, which forms one side of a suitable supply circuit for the heating current, the other side 28 of such circuit being connected through three switches 29, 30, and 31, to the other terminals of the three series of coils 23, 24, and 25 respectively.

By means of the three switches 29, 30, and 31, the three series of coils may all be connected in circuit in parallel, or any two of them may be connected in parallel with the third cut out, or any one may be connected in circuit with the other two cut out, thus giving seven different degrees of heat which may be obtained. Each set of heating coils 23, 24, or 25 acts uniformly throughout the casing 20 whether the other coils are acting or not, so that a uniform heating at the base of the receptacle 15 is always obtained. The heater 13 acts to heat the lower strata of air within the receptacle 15, causing such air to rise to displace the cooler air above it, the rising hot air striking the chocolate pot or reservoir 11 and heating it to maintain the chocolate at the desired temperature, and the falling air coming in contact with the heater 13 and being heated thereby, thus causing a continuous flow of convection currents for maintaining the chocolate at a uniform heat without scorching. A very exact control of the heat is obtained by means of the switches 29, 30, and 31, which are conveniently mounted on one of the legs of the table 10 for access by the operator.

In the arrangement just described the chocolate is not maintained hot after being removed from the chocolate reservoir 11. However, it is sometimes desirable to maintain this chocolate hot until the dipping process is completed, and under such conditions the arrangement shown in Figs. 4 and 5 is used. In this arrangement there is the central chocolate pot or reservoir 11', which however is made of an integral piece of metal with the table top 30, being separated from the latter by flanges 31. The table top 30 is also surrounded by a flange 32, which with the flanges 31 forms two shallow trays on opposite sides of the reservoir 11'. Below the chocolate reservoir 11' a heater 13, of the construction already described, is located, being supported on legs 14 above the bottom of a receptacle 15'. The bottom of this receptacle 15' is flat, but its sides flare upwardly and outwardly nearly to the outer edges of the table top 30, forming an air space wherein hot air rising from the heater 13 may rise not only against the sides of the chocolate reservoir 11' but against the under surface of the table top 30. The upper edges of the sides of the receptacle 15' terminate in horizontal portions 33 spaced slightly from and below the table top 30 so as to leave an air space, these portions 33 at their outer edges having upturned flanges 34 which support the edges of the table top 30. The bottom of the receptacle 15' and also the flanges 34 are perforated to coöperate with sliding dampers 35 and 36, by which air may be shut off from the interior of the receptacle 15' to cause the chocolate reservoir 11 and the table top 30 to be heated by convection currents as is the case in the arrangement shown in Figs. 1 and 2, or air may be admitted through the bottom of such receptacle, heated by the heater 13, allowed to rise into contact with the chocolate pot 11' and the under side of the table top 30, and permitted to escape through the openings in the flanges 34. The amount of this air flow may thus be controlled or cut off entirely by the dampers 35 and 36.

In order to vary the distribution of heat between the bottom of the chocolate pot 11' and the under side of the table top 30, swinging baffle plates 37 are provided at each side of the chocolate pot and close to the heater 13, these baffle plates 37 being separately operable by suitable sliding rods 38 to deflect more or less of the air rising from the heater 13 away from the bottom of the chocolate pot 11', so that the relative heating of the chocolate pot and of the table top may be controlled and this control may be independent for the two sides of the table.

I claim as my invention:

1. A chocolate heating apparatus, comprising a chocolate reservoir, a receptacle into which said reservoir depends, and an electric heater located in the lower part of said receptacle, said reservoir being spaced from the heater and from the walls of the receptacle to provide an air space, and movable baffle plates for deflecting to a greater or less extent the currents of air rising from the heater toward the reservoir.

2. A chocolate heating apparatus, comprising a chocolate reservoir, a receptacle into which said reservoir depends, and an electric heater located in the lower part of said receptacle, said reservoir being spaced from the heater and from the walls of the receptacle to provide an air space, said receptacle being provided with openings for permitting the flow of air therethrough, and a damper for controlling such flow of air.

3. A chocolate heating apparatus, comprising a chocolate reservoir, a receptacle into which said reservoir depends, and an electric heater located in the lower part of said receptacle, said reservoir being spaced from the heater and from the walls of the receptacle to provide an air space, said receptacle being provided with openings for permitting the flow of air therethrough.

4. A chocolate heating apparatus, comprising a table having a depression to form a chocolate reservoir, an electric heater located below and spaced from the bottom of said reservoir, and a receptacle in which said heater is mounted and which is located below the table and reservoir and spaced therefrom so as to afford an air space for the passage of heating air currents from the heater to the under side of the reservoir and table, and movable baffle plates controlling the flow of such air currents.

5. A chocolate heating apparatus, comprising a table having a depression to form a chocolate reservoir, an electric heater located below and spaced from the bottom of said reservoir, and a receptacle in which said heater is mounted and which is located below the table and reservoir and spaced therefrom so as to afford an air space for the passage of heating air currents from the heater to the under side of the reservoir and table, said receptacle being provided with an opening below the heater for the inlet of air to the receptacle and with an opening near the top for the outlet of air, and a damper controlling one of said openings.

6. A chocolate heating apparatus, comprising a table having a depression to form a chocolate reservoir, an electric heater located below and spaced from the bottom of said reservoir, and a receptacle in which said heater is mounted and which is located below the table and reservoir and spaced therefrom so as to afford an air space for the passage of heating air currents from the heater to the under side of the reservoir and table, said receptacle being provided with an opening below the heater for the inlet of air to the receptacle and with an opening near the top for the outlet of air.

In witness whereof, I have hereunto set my hand at Indianapolis, Indiana, this third day of November, A. D. one thousand nine hundred and fourteen.

H. W. SCHWIMMER.

Witnesses:
  JOSEPHINE GASPER,
  G. B. SCHLEY.